US008893247B1

(12) United States Patent
Faaborg

(10) Patent No.: US 8,893,247 B1
(45) Date of Patent: Nov. 18, 2014

(54) DYNAMIC TRANSMISSION OF USER INFORMATION TO TRUSTED CONTACTS

(71) Applicant: Google Inc., Mountain View, CA (US)

(72) Inventor: Alexander Faaborg, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/714,839

(22) Filed: Dec. 14, 2012

(51) Int. Cl.
*G06F 7/04* (2006.01)
*G06F 21/31* (2013.01)

(52) U.S. Cl.
CPC .................................. *G06F 21/31* (2013.01)
USPC ............................................................ 726/7

(58) Field of Classification Search
USPC ............................................................ 726/7
See application file for complete search history.

(56) References Cited

U.S. PATENT DOCUMENTS

| 7,403,972 | B1 | 7/2008 | Lau et al. |
| 7,496,633 | B2 | 2/2009 | Szeto et al. |
| 7,503,007 | B2 | 3/2009 | Goodman et al. |
| 7,551,935 | B2 | 6/2009 | Karmakar |
| 8,224,359 | B2 | 7/2012 | Marlow et al. |
| 2006/0215242 | A1 | 9/2006 | Besharat et al. |
| 2007/0207793 | A1 | 9/2007 | Myer et al. |
| 2008/0045138 | A1 | 2/2008 | Milic-Frayling et al. |
| 2009/0327484 | A1* | 12/2009 | Chen et al. .................... 709/224 |
| 2010/0120456 | A1 | 5/2010 | Karmarkar et al. |
| 2010/0255865 | A1 | 10/2010 | Karmarkar |
| 2010/0279666 | A1 | 11/2010 | Small et al. |
| 2011/0276396 | A1 | 11/2011 | Rathod |
| 2012/0094700 | A1 | 4/2012 | Karmarkar et al. |
| 2013/0024473 | A1* | 1/2013 | Krishnan et al. .............. 707/769 |

OTHER PUBLICATIONS

Cemerlang, P. et al., "Towards Automatic Mobile Blogging," ICME 2006, pp. 2033-2036.
Lugano, G., "Understanding Mobile Relationships," Human Centred Technology Workshop (HCT 2006; Pori, Finland).
Siewiorek, D. et al., "SenSay: A Context-Aware Mobile Phone," In Proceedings of IEEE International Symposium on Wearable Computers (ISWC). 2003. New York, NY.

* cited by examiner

*Primary Examiner* — Kambiz Zand
*Assistant Examiner* — Aubrey Wyszynski
(74) *Attorney, Agent, or Firm* — McDonnell Boehnen Hulbert & Berghoff LLP

(57) ABSTRACT

Methods and systems involving the dynamic transmission of user information to trusted contacts are described herein. An example system may be configured to (a) receive, at a first computing device, a command to send message data to a second computing device, where the second computing device is associated with a contact; (b) determine that the contact associated with the second computing device is a trusted contact; (c) based on (i) receiving the command to send the message data and (ii) determining that the contact is a trusted contact, cause a multimedia-capture device to obtain multimedia data; and (d) transmit trusted-contact data to the second computing device associated with the trusted contact, where the trusted-contact data comprises (i) the message data, (ii) the multimedia data, and (iii) environmental data that corresponds to at least one environmental condition of the first computing device.

30 Claims, 13 Drawing Sheets

DYNAMIC TRANSMISSION OF USER INFORMATION TO TRUSTED CONTACTS

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. The manner in which these devices provide information to users is becoming more intelligent, efficient, intuitive, and/or less obtrusive.

Additionally, such devices can communicate with one another, either directly or indirectly, with increasing ease and in an increasing number of ways. As a result, users may readily share media and/or information or otherwise interact with each other via their devices. Such interaction may be in real time, or near-real time, as perceived by the user.

However, some techniques for sharing media and/or information may, at times, share too much media and/or information and may, at other times, share too little media and/or information.

SUMMARY

The systems and methods described herein generally relate to dynamic transmission of user information to trusted contacts.

In one example embodiment, a system is provided. The system may include: (1) a multimedia-capture device; (2) a non-transitory computer readable medium; and (3) program instructions stored on the non-transitory computer readable medium and executable by at least one processor to cause a first computing device to: (a) receive a command to send message data to a second computing device, where the second computing device is associated with a contact; (b) determine that the contact associated with the second computing device is a trusted contact; (c) based on (i) receiving the command to send the message data and (ii) determining that the contact associated with the second computing device is a trusted contact, cause the multimedia-capture device to obtain multimedia data; and (d) transmit trusted-contact data to the second computing device associated with the trusted contact, where the trusted-contact data comprises (i) the message data, (ii) the multimedia data, and (iii) environmental data that corresponds to at least one environmental condition of the first computing device.

In a further aspect, a computer implemented method is provided. The method may involve: (1) receiving, at a first computing device, a command to send message data to a second computing device, where the second computing device is associated with a contact; (2) determining that the contact associated with the second computing device is a trusted contact; (3) based on (i) receiving the command to send the message data and (ii) determining that the contact associated with the second computing device is a trusted contact, causing a multimedia-capture device to obtain multimedia data; and (4) transmitting trusted-contact data to the second computing device associated with the trusted contact, wherein the trusted-contact data comprises (i) the message data, (ii) the multimedia data, and (iii) environmental data that corresponds to at least one environmental condition of the first computing device.

In a further aspect, a non-transitory computer-readable medium is provided. The non-transitory computer-readable medium may include: (1) instructions for receiving, at a first computing device, a command to send message data to a second computing device, where the second computing device is associated with a contact; (2) instructions for determining that the contact associated with the second computing device is a trusted contact; (3) based on (i) receiving the command to send the message data and (ii) determining that the contact associated with the second computing device is a trusted contact, instructions for causing a multimedia-capture device to obtain multimedia data; and (4) instructions for transmitting trusted-contact data to the second computing device associated with the trusted contact, wherein the trusted-contact data comprises (i) the message data, (ii) the multimedia data, and (iii) environmental data that corresponds to at least one environmental condition of the first computing device.

In a further aspect, a system is provided. The system may include: (1) a non-transitory computer readable medium; and (2) program instructions stored on the non-transitory computer readable medium and executable by at least one processor to cause the system to: (a) receive trusted-contact data from a first computing device, where the trusted-contact data comprises (i) message data, (ii) multimedia data, and (iii) environmental data that corresponds to at least one environmental condition of the first computing device; (b) receive formatting data that corresponds to a second computing device, where the formatting data indicates at least one display characteristic of the second computing device; and (c) based on (i) the received trusted-contact data and (ii) the received formatting data, transmit delivery data to the second computing device, where the delivery data comprises (i) the message data, (ii) the multimedia data, and (iii) the environmental data, where the delivery data is formatted based on the display characteristic indicated by the formatting data.

In a further aspect, a computer implemented method is provided. The method may involve: (1) receiving trusted-contact data from a first computing device, where the trusted-contact data comprises (i) message data, (ii) multimedia data, and (iii) environmental data that corresponds to at least one environmental condition of the first computing device; (2) receiving formatting data that corresponds to a second computing device, where the formatting data indicates at least one display characteristic of the second computing device; and (3) based on (i) the received trusted-contact data and (ii) the received formatting data, transmitting delivery data to the second computing device, where the delivery data comprises (i) the message data, (ii) the multimedia data, and (iii) the environmental data, where the delivery data is formatted based on the display characteristic indicated by the formatting data.

In a further aspect, a non-transitory computer-readable medium is provided. The non-transitory computer-readable medium may include: (1) instructions for receiving trusted-contact data from a first computing device, where the trusted-contact data comprises (i) message data, (ii) multimedia data, and (iii) environmental data that corresponds to at least one environmental condition of the first computing device; (2) instructions for receiving formatting data that corresponds to a second computing device, where the formatting data indicates at least one display characteristic of the second computing device; and (3) based on (i) the received trusted-contact data and (ii) the received formatting data, instructions for transmitting delivery data to the second computing device, where the delivery data comprises (i) the message data, (ii) the multimedia data, and (iii) the environmental data, where the delivery data is formatted based on the display characteristic indicated by the formatting data.

These as well as other aspects, advantages, and alternatives, will become apparent to those of ordinary skill in the art by reading the following detailed description, with reference where appropriate to the accompanying drawings.

DETAILED DESCRIPTION

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

I. Overview

An example embodiment may involve a first computing device transmitting data to a second computing device. The first computing device, (sometimes referred to herein as the "sending device"), may include an input device, such as a touch pad or a microphone, a sensor, such as a Global Position System (GPS) sensor, and a multimedia-capture device, such as a camera or a video-camera, any of which may be part of a head-mountable display (HMD), among other devices and/or components. The second computing device, (sometimes referred to herein as the "receiving device"), may also include a HMD, among other devices and/or components. The two computing devices may be used by two users, for instance a "sender" and a "receiver," respectively. An example embodiment may additionally involve a system server that helps facilitate communications between the first computing device and the second computing device.

Figure 1:
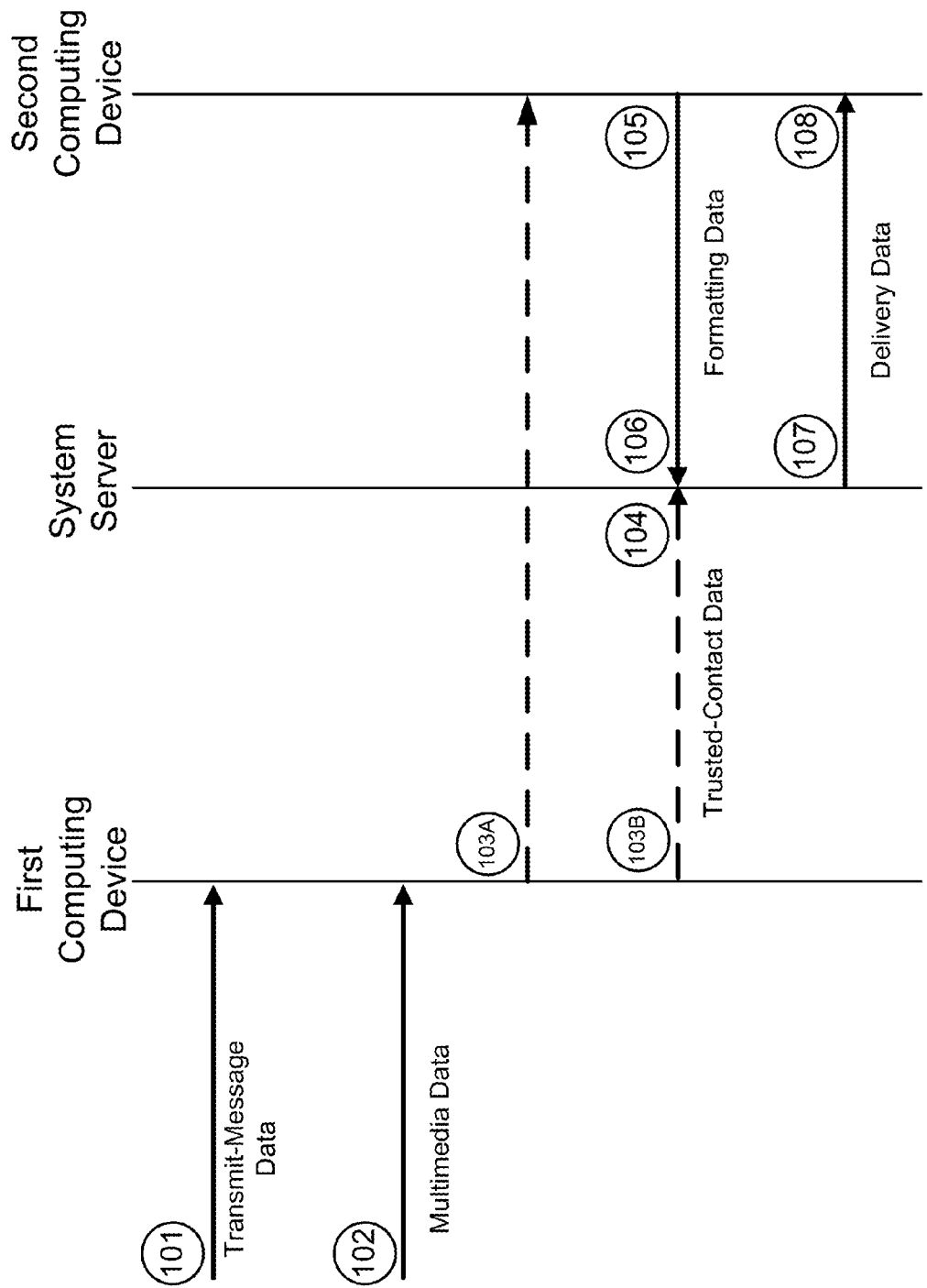
FIG. 1 shows a signal-flow diagram depicting signal flow to and from computing devices and a system server in accordance with an example embodiment.

For purposes of example and explanation, an example flow of data and interaction between the two computing devices and the system server is shown in the signal flow diagram of FIG. 1. As shown in FIG. 1, the first computing device may be configured to receive 101 a command to send message data from an input device. The command may include a command to send message data to a recipient device, for instance, the second computing device. The second computing device may be associated with a contact.

After receiving the command to send message data, the first computing device may determine that the contact associated with the second computing device is a trusted contact. Because the contact is "trusted," the first computing device may transmit multimedia data and/or environmental data with the message data.

Accordingly, the first computing device may be configured to obtain 102 multimedia data from the multimedia-capture device. Upon obtaining the multimedia data, the first computing device may be configured to transmit trusted-contact data to the second computing device. In an embodiment, the first computing device may transmit 103A trusted-contact data directly to the second computing device. In another embodiment, the first computing device may transmit 103B trusted contact data to the system server for delivery by the system server to the second computing device.

As noted, in addition to the message data and multimedia data, the trusted-contact data may include environmental data. Such environmental data may indicate a computing condition of the first computing device, a real-world environmental condition, and/or a physiological condition. In an embodiment, the environmental data may be obtained via one or more sensors or the multimedia-capture device of the multimedia-capture device. Further, the environmental data may be obtained before, at the same time, or after the first computing device obtained the multimedia data.

Additionally, the second computing device may be configured to transmit 105 formatting data to the system server. The formatting data may indicate at least one display characteristic of the second computing device. FIG. 1 depicts the first computing device transmitting 103 the trusted-contact data at the same time the second computing device transmits 105 the formatting data to the system server. However, it should be understood that the transmission 103 of the trusted-contact data may occur before or after the transmission 105 of the formatting data, without departing from the present invention.

The system server may be configured to receive 104 the trusted-contact data and to receive 106 the formatting data. Based on the received trusted-contact data and the received formatting data, the system server may be configured to transmit 107 delivery data to the second computing device. The delivery data may be formatted based on the display characteristic indicated by the formatting data. The second computing device may be configured to receive 108 the delivery data and display the delivery data on a display.

It should be understood that the above example set forth with respect to FIG. 1 is set forth for illustrative purposes, and should not be taken to be limiting. In particular, although certain examples are described herein as involving HMDs, it should be understood that other computing devices may be used as well. Further, while certain examples are described herein as involving a system server, it should be understood that, in some embodiments, computing devices may communicate directly (or indirectly) over one or more networks without the involvement of a system server.

II. Example Wearable Computing Devices

In general, and as described above, an example system may be implemented in or may take the form of a wearable computer. However, an example system may also be implemented in or take the form of other devices, such as a mobile phone, a laptop, or a tablet device, among others. Further, an example system may take the form of non-transitory computer readable medium, which has program instructions stored thereon that are executable by one or more processors to provide the functionality described herein. An example system may also take the form of a device such as a wearable computer, mobile phone, or tablet device, or a subsystem of such a device, which includes such a non-transitory computer readable medium having such program instructions stored thereon.

Figure 2:
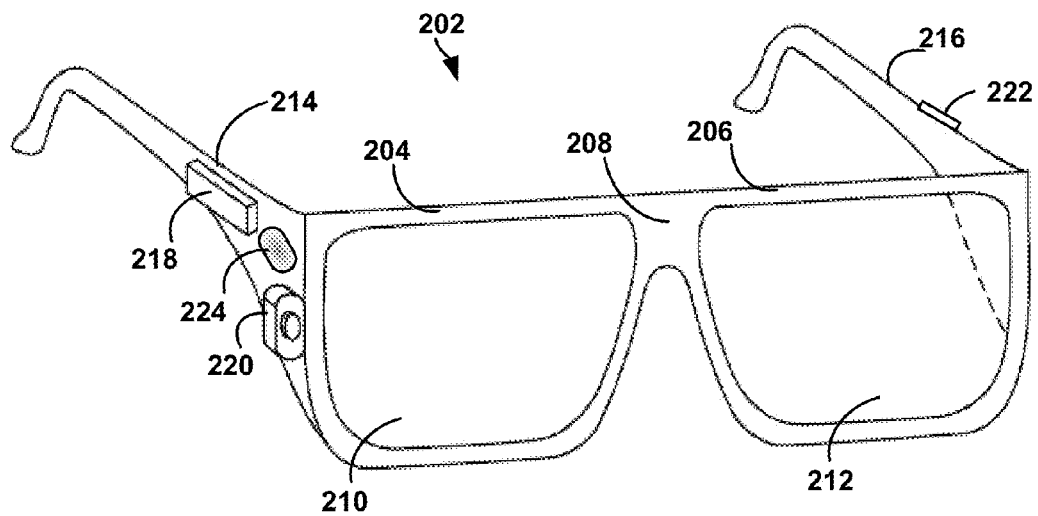
FIG. 2 shows a first view of an example wearable computing system in accordance with an example embodiment.

FIG. 2 illustrates a wearable computing system according to an example embodiment. In FIG. 2, the wearable computing system takes the form of a head-mountable display (HMD) 202, which may also be referred to as a head-mountable device. It should be understood that a HMD as described herein need not be worn by a user to be referred to as a HMD. In this sense, the HMD may be alternatively understood to be, or referred to as, a "head-mountable display." Additionally, it should be understood that example systems and devices may take the form of or be implemented within or in association with other types of devices, without departing from the scope of the invention. As illustrated in FIG. 2, the HMD 202 comprises frame elements including lens-frames 204, 206 and a center frame support 208, lens elements 210, 212, and extending side-arms 214, 216. The center frame support 208 and the extending side-arms 214, 216 are configured to secure the HMD 202 to a user's face via a user's nose and ears, respectively.

Each of the frame elements 204, 206, and 208 and the extending side-arms 214, 216 may be formed of a solid structure of plastic and/or metal, or may be formed of a hollow structure of similar material so as to allow wiring and component interconnects to be internally routed through the HMD 202. Other materials may be possible as well.

One or more of each of the lens elements 210, 212 may be formed of any material that can suitably display a projected image or graphic. Each of the lens elements 210, 212 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 214, 216 may each be projections that extend away from the lens-frames 204, 206, respectively, and may be positioned behind a user's ears to secure the HMD 202 to the user. The extending side-arms 214, 216 may further secure the HMD 202 to the user by extending around a rear portion of the user's head. Additionally or alternatively, for example, the HMD 202 may connect to or be affixed within a head-mountable helmet structure. Other possibilities exist as well.

The HMD 202 may also include an on-board computing system 218, a video camera 220, a sensor 222, and a finger-operable touch pad 224. The on-board computing system 218 is shown to be positioned on the extending side-arm 214 of the HMD 202; however, the on-board computing system 218 may be provided on other parts of the HMD 202 or may be positioned remote from the HMD 202 (e.g., the on-board computing system 218 could be wire- or wirelessly-connected to the HMD 202). The on-board computing system 218 may include a processor and memory, for example. The on-board computing system 218 may be configured to receive and analyze data from the video camera 220, the sensor 222, and the finger-operable touch pad 224 (and possibly from other sensory devices, user interfaces, or both) and generate images for output by the lens elements 210 and 212.

The video camera 220 is shown positioned on the extending side-arm 214 of the HMD 202; however, the video camera 220 may be provided on other parts of the HMD 202. The video camera 220 may be configured to capture images at various resolutions or at different frame rates. Many video cameras with a small form-factor, such as those used in cell phones or webcams, for example, may be incorporated into an example of the HMD 202.

Further, although FIG. 2 illustrates one video camera 220, more video cameras may be used, and each may be configured to capture the same view, or to capture different views. For example, the video camera 220 may be forward facing to capture at least a portion of the real-world view perceived by the user, as described in the example embodiment above.

The sensor 222 is shown on the extending side-arm 216 of the HMD 202; however, the sensor 222 may be positioned on other parts of the HMD 202. The sensor 222 may include one or more of a gyroscope, an accelerometer, or a magnetic field sensor, for example. Other sensing devices may be included within, or in addition to, the sensor 222, or other sensing functions may be performed by the sensor 222.

The finger-operable touch pad 224 is shown on the extending side-arm 214 of the HMD 202. However, the finger-operable touch pad 224 may be positioned on other parts of the HMD 202. Also, more than one finger-operable touch pad may be present on the HMD 202. The finger-operable touch pad 224 may be used by a user to input commands. The finger-operable touch pad 224 may sense at least one of a position and a movement of a finger via capacitive sensing, resistance sensing, or a surface acoustic wave process, among other possibilities. The finger-operable touch pad 224 may be capable of sensing finger movement in a direction parallel or planar to the pad surface, in a direction normal to the pad surface, or both, and may also be capable of sensing a level of pressure applied to the pad surface. The finger-operable touch pad 224 may be formed of one or more translucent or transparent insulating layers and one or more translucent or transparent conducting layers. Edges of the finger-operable touch pad 224 may be formed to have a raised, indented, or roughened surface, so as to provide tactile feedback to a user when the user's finger reaches the edge, or other area, of the finger-operable touch pad 224. If more than one finger-operable touch pad is present, each finger-operable touch pad may be operated independently, and may provide a different function.

Figure 3:
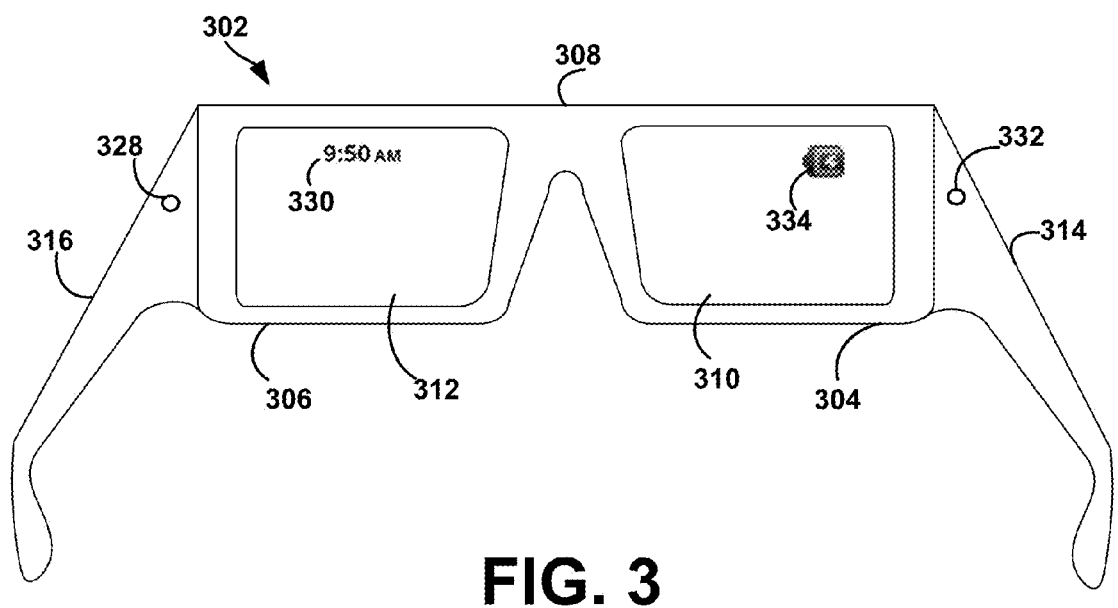
FIG. 3 shows a second view of the example wearable computing system shown in FIG. 2.

FIG. 3 illustrates an alternate view of the wearable computing device illustrated in FIG. 2. As shown in FIG. 3, the lens elements 310, 312 may act as display elements. The HMD 302 may include a first projector 328 coupled to an inside surface of the extending side-arm 316 and configured to project a display 330 onto an inside surface of the lens element 312. Additionally or alternatively, a second projector 332 may be coupled to an inside surface of the extending side-arm 314 and configured to project a display 334 onto an inside surface of the lens element 310.

The lens elements 310, 312 may act as a combiner in a light projection system and may include a coating that reflects the light projected onto them from the projectors 328, 332. In some embodiments, a reflective coating may not be used (e.g., when the projectors 328, 332 are scanning laser devices).

In alternative embodiments, other types of display elements may also be used. For example, the lens elements 310, 312 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 304, 306 for driving such a matrix display. Alternatively or additionally, a laser or LED source and scanning system could be used to draw a raster display directly onto the retina of one or more of the user's eyes. Other possibilities exist as well.

Figure 4:
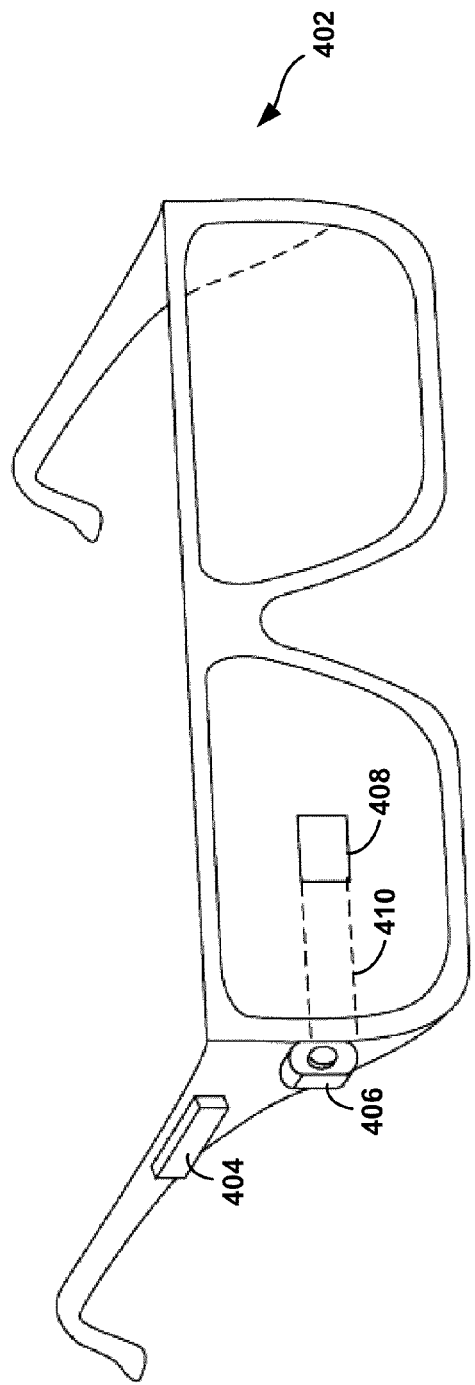
FIG. 4 shows an example wearable computing system in accordance with an example embodiment.

FIG. 4 illustrates another wearable computing system according to an example embodiment, which takes the form of an HMD 402. The HMD 402 may include frame elements and side-arms such as those described with respect to FIGS. 2 and 3. The HMD 402 may additionally include an on-board computing system 404 and a video camera 406, such as those described with respect to FIGS. 2 and 3. The video camera 406 is shown mounted on a frame of the HMD 402. However, the video camera 406 may be mounted at other positions as well.

As shown in FIG. 4, the HMD 402 may include a single display 408 which may be coupled to the device. The display 408 may be formed on one of the lens elements of the HMD 402, such as a lens element described with respect to FIGS. 2 and 3, and may be configured to overlay computer-generated graphics in the user's view of the physical world. The display 408 is shown to be provided in a center of a lens of the HMD 402, however, the display 408 may be provided in other positions. The display 408 is controllable via the computing system 404 that is coupled to the display 408 via an optical waveguide 410.

Figure 5:
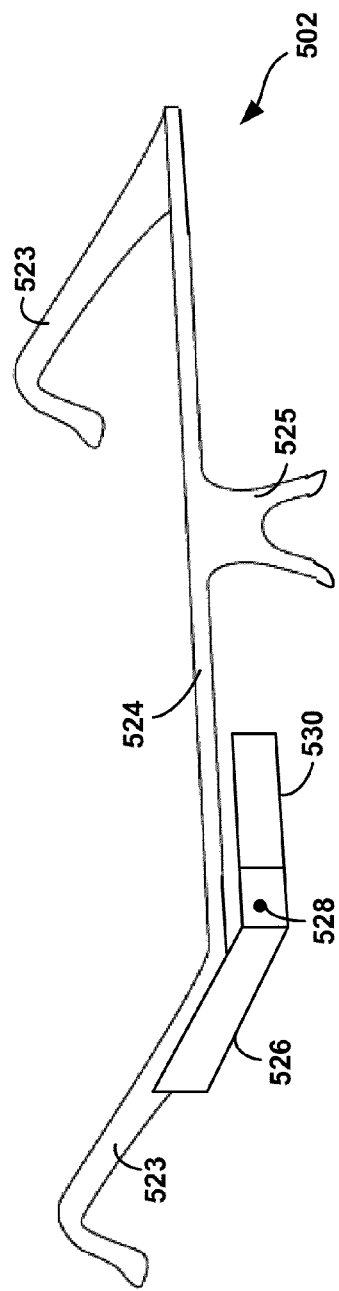
FIG. 5 shows an example wearable computing system in accordance with an example embodiment.

FIG. 5 illustrates another wearable computing system according to an example embodiment, which takes the form of an HMD 502. The HMD 502 may include side-arms 523, a center frame support 524, and a bridge portion with nosepiece 525. In the example shown in FIG. 5, the center frame support 524 connects the side-arms 523. The HMD 502 does not include lens-frames containing lens elements. The HMD 502 may additionally include an on-board computing system 526 and a video camera 528, such as those described with respect to FIGS. 2 and 3.

The HMD 502 may include a single lens element 530 that may be coupled to one of the side-arms 523 or the center frame support 524. The lens element 530 may include a display such as the display described with reference to FIGS. 2 and 3, and may be configured to overlay computer-generated graphics upon the user's view of the physical world. In one example, the single lens element 530 may be coupled to the inner side (i.e., the side exposed to a portion of a user's head when worn by the user) of the extending side-arm 523. The single lens element 530 may be positioned in front of or proximate to a user's eye when the HMD 502 is worn by a user. For example, the single lens element 530 may be positioned below the center frame support 524, as shown in FIG. 5.

III. Example Communication System

Figure 6A:
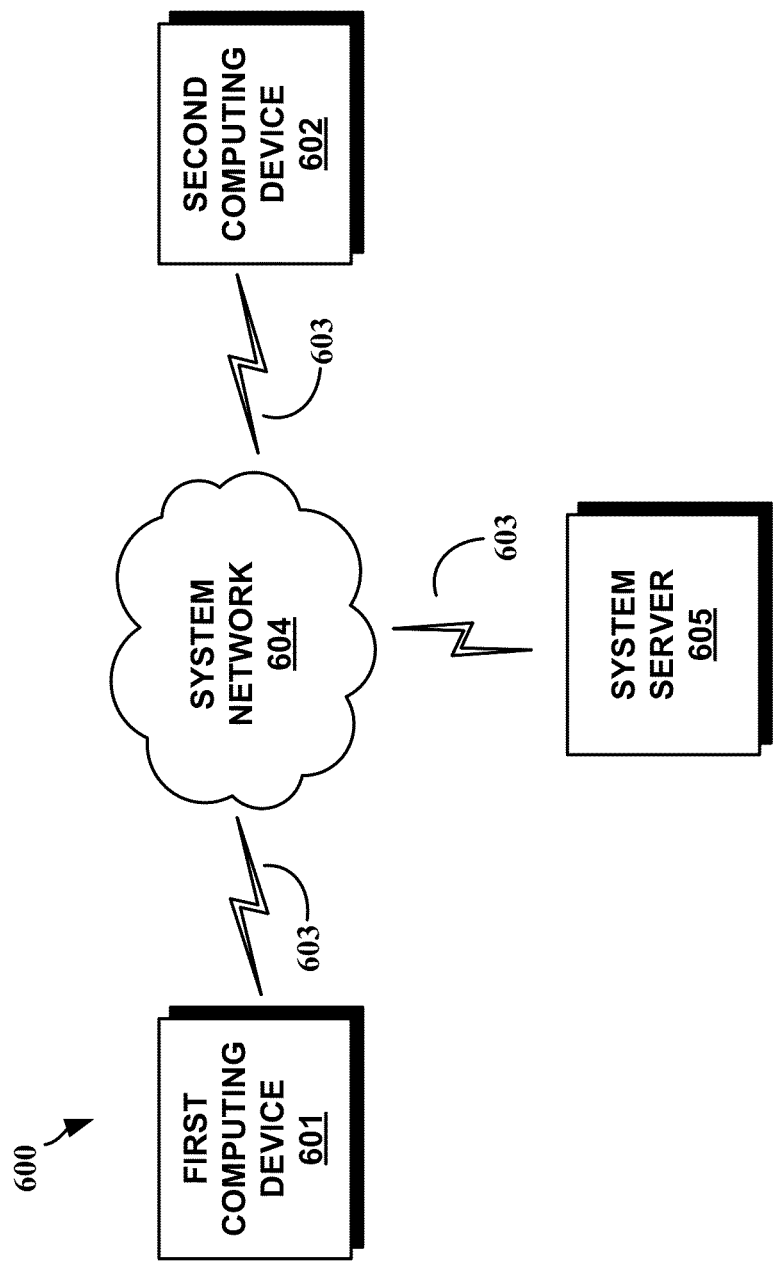
FIG. 6A shows a simplified block diagram of an example communication system.

FIG. 6A illustrates an example communication system 600, in which the present methods may be implemented. The communication system 600 may include a first computing device 601, a second computing device 602, a system network 604, and a system server 605. The first computing device 601, the second computing device 602, and the system server 605 may be connected to the system network 604 using a respective communication link 603, each of which may be similar or different.

The communication link 603 may be wireless, and may implement, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. However, wired connections may be used additionally or alternatively. For example, the communication link 603 may be a wired serial bus such as a universal serial bus or a parallel bus, among other connections. Either of such a wireless and/or wired connection may be a proprietary connection as well.

Note that, while system network 604 is shown, the computing devices 601, 602 may communicate directly utilizing either a wireless or wired connection. For instance, in an embodiment, the first computing device 601 may communicate with the second computing device 602 without the use of the system network 604. The system server 604 may communicate directly with the computing devices 601, 602 in a similar manner.

In another embodiment, the computing devices 601, 602, and the system server 604 may communicate with one another indirectly via the system network 604. The system network 604 may include, for example, a cellular network, a local area network, and/or a public network such as the Internet, among other types of networks. Furthermore, the computing devices 601, 602 may also communicate indirectly through the system server 605. For example, the first computing device 601 may communicate a message for the second computing device 602 to the system server 605. In turn, the system server 605 may then communicate the message to the second computing device 602.

FIG. 6A depicts an example communication system, which sets forth certain components for purposes of explanation. It should be understood that additional and/or alternative components may be present, without departing from the present invention. And other example communication systems may be utilized within the scope of the present invention.

IV. Example Methods

Figure 7A:
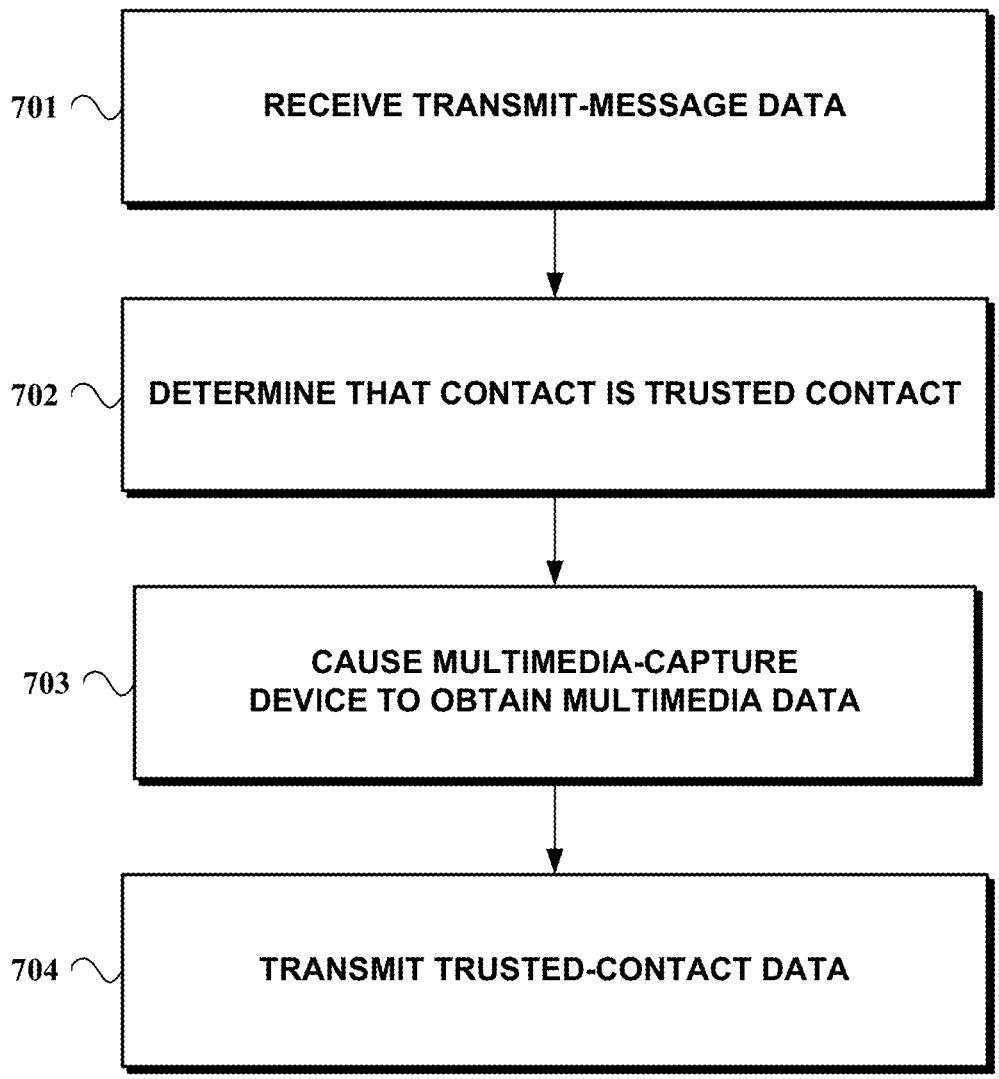
FIG. 7A shows a flowchart depicting a first example method.
Figure 7B:
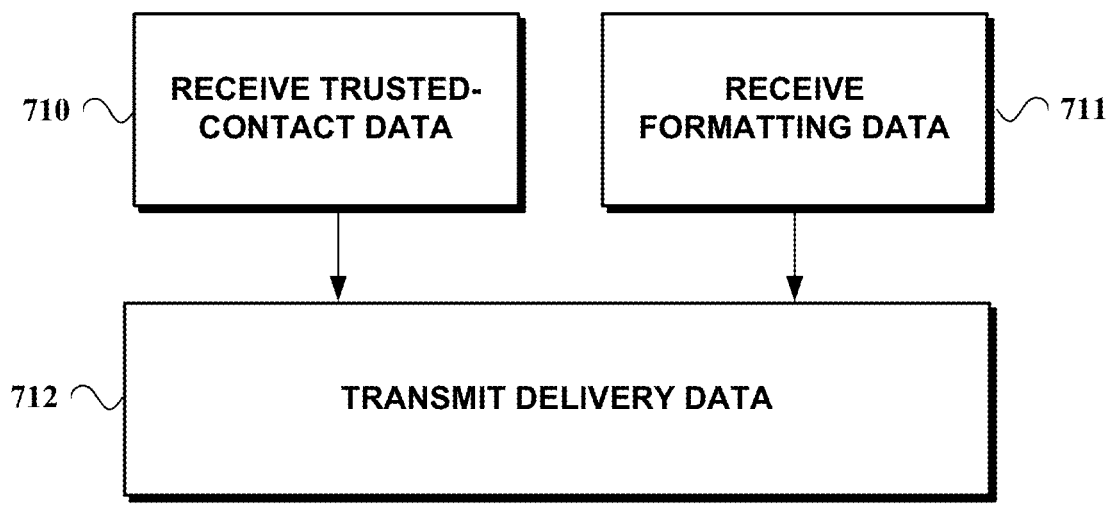
FIG. 7B shows a flowchart depicting a second example method.

FIG. 7A shows a flowchart depicting an example method implemented by a first computing device. FIG. 7B shows a flowchart depicting an example method implemented by a system server. For clarity, the methods will be described herein with each step explained more fully by reference to FIGS. 8-11. FIGS. 8-11 generally correspond to a sender, a system server, and a receiver at various points in time, Time 1-Time 4. It should be understood, however, that neither of methods 7A and 7B necessarily includes the steps of the other, and that each method may be performed independently of the other.

Further, the method shown in FIG. 7A is described and illustrated, by way of example, as being carried out by a wearable computer and, in particular, by a wearable computer that includes an HMD. The HMD includes at least one sensor, such as a GPS sensor among other examples, and a multimedia-capture device, such as a camera or a video-camera among other examples. Accordingly, in an embodiment, the multimedia-capture device may be head-mountable. However, it should be understood that example methods may be carried out by a device other than a wearable computer, and/or may be carried out by sub-systems in a wearable computer or in other devices. For example, the example methods may alternatively be carried out by other devices such as a mobile phone, laptop computer, or tablet device, either of which may include suitable sensors and multimedia-capture components, which may also be coupled together. Other examples are also possible.

Further, for any situations in which the systems discussed herein may collect or use personal information about users, the users may be provided with an opportunity to opt in/out of programs or features that may collect or use personal information. For instance, the user may be prompted, and required, to provide explicit approval to perform the methods or steps thereof described herein.

As stated above, the example method of FIG. 7A may involve a first computing device, for example, the first computing device 601 of FIG. 6A, receiving a command to send message data, as shown in block 701. The command may be a command to send message data to a second computing device, for example, the second computing device 602 of FIG. 6A. As discussed further below, the second computing device may be associated with a contact as indicated, for example, by data that is stored or otherwise accessible by the first computing device.

The message data may be at least one of audio data, textual data, video data and image data. For example, the message data may be textual data in the form of a text message. In another example, the message data may include a text message and audio data of the sender's voice. In other examples, the message data may be video data in the form of a recorded video message. In other examples, the message data may include any suitable combination of audio data, textual data, image data, and video data. Other examples of message data may exist as well.

The first computing device may receive the command to send message data via inputs at an input device, such as, manual inputs at a touch pad or a keyboard, and/or voice commands at a microphone, among other examples. As one particular example, the sender may navigate to a list of contacts using a touch pad and enter a textual message via the touch pad. Each contact in the list of contacts may be associated with other computing devices. The sender may then select from the list of contacts a particular contact that he desires to send the message data to. In another example, the sender may provide the first computing device a voice command indicating a message for a particular contact. The first computing device may analyze the voice command and determine which contact the message is intended for. In other embodiments, both voice commands and manual inputs may be used to input the command to send message data. It should be understood that the first computing device may receive the command to send message data in other ways, all of which are within the scope of the present invention.

Figure 8:
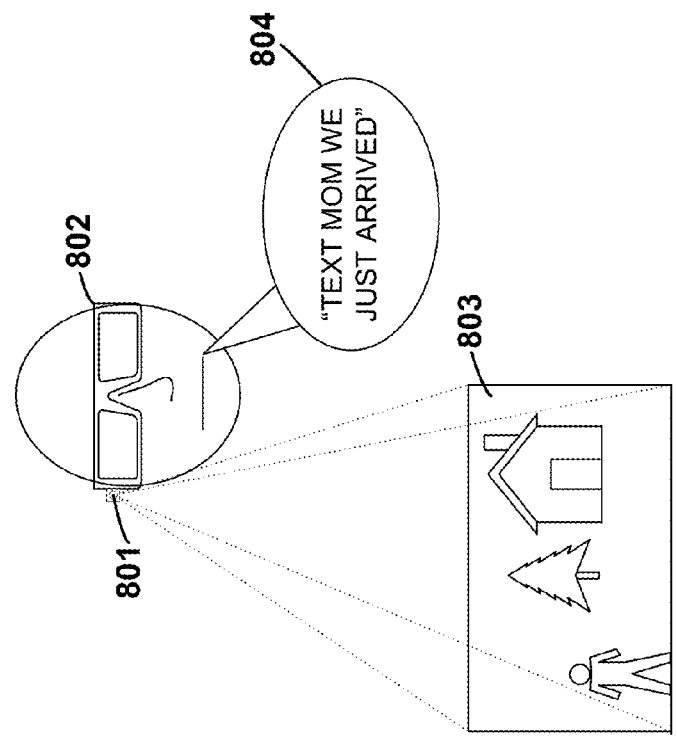
FIG. 8 shows receiving a command to send message data in accordance with the first example method at Time 1.

FIG. 8 depicts an example where the first computing device receives the command to send message data via voice commands at a microphone included on the sender's HMD 802. At Time 1, the first computing device receives the voice command 804, "TEXT MOM WE JUST ARRIVED". The first computing device interprets the voice command as a textual message, consisting of "WE JUST ARRIVED", intended for a computing device associated with the contact, "MOM". As shown in FIG. 8, the sender's HMD 802 includes a camera 801, among other components. A view of an image 803 captured by camera 801 is shown, and indicates a person standing to the right of a home (from the sender's perspective).

At block 702, the first computing device may determine that the contact associated with the second computing device is a trusted contact. Such determination may be performed in a variety of ways. In one embodiment, the first computing device may determine that the contact is a trusted contact by searching a trusted contact list for the contact associated with the second computing device. The trusted contact list may be located on a storage device that is maintained or otherwise accessible by the first computing device, such as storage device 1424 discussed further below with respect to FIG. 14.

The trusted contact list may be created in a variety of ways. As one example, when the sender adds a new contact to his device's contact list, the sender may affirmatively place the new contact on the trusted contact list. In another example, the sender may select a subset of his device's contact list and place the subset on the trusted contact list. Other examples may exist.

In accordance with block 702, the first computing device may determine that the contact associated with the second computing device is a trusted contact by determining that a trust indicator associated with the contact is enabled. The trust indicator may be part of contact data associated with the contact. The trust indicator may be any suitable representation that a contact is a trusted contact. The trust indicator is enabled when a contact is designated as a trusted contact. For example, the trust indicator may be a binary entry field, where a "1" indicates that the trust indicator is enabled, i.e., the contact is a trusted contact, and a "0" indicates that the trust indicator is not enabled, i.e., the contact is not a trusted contact. In another example, the trust indicator may be a textual entry field, where a "YES" indicates that the trust indicator is enabled, and a "NO" indicates that the trust indicator is not enabled. Other examples are certainly possible, all of which are within the scope of the present invention. The trust indicator may be enabled via inputs at the input device, for example, manual inputs at a touch pad or a keyboard, and/or voice commands at a microphone.

Figure 6B:
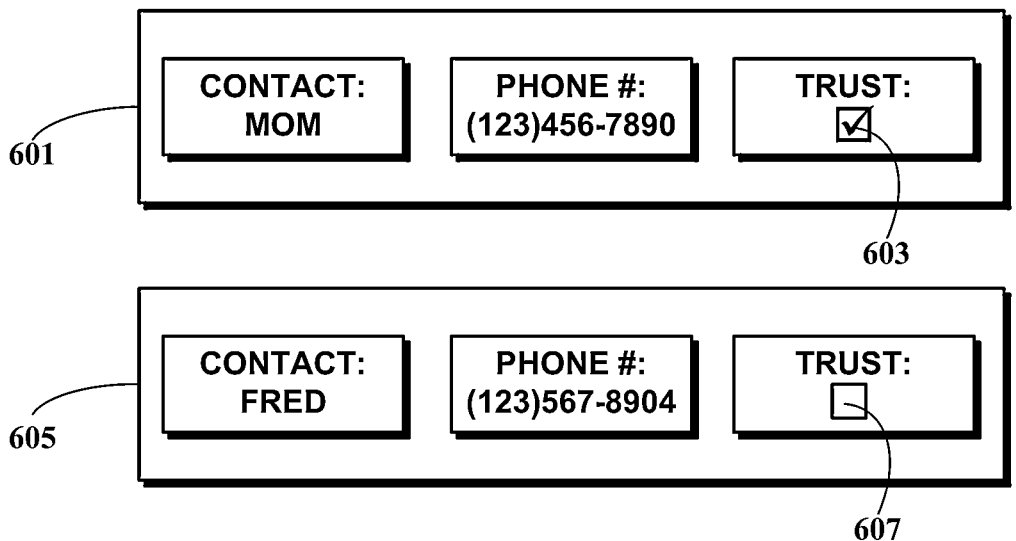
FIG. 6B shows simplified block diagrams depicting a first set of example contact data that may be stored by the network devices shown in FIG. 6A.
Figure 6C:
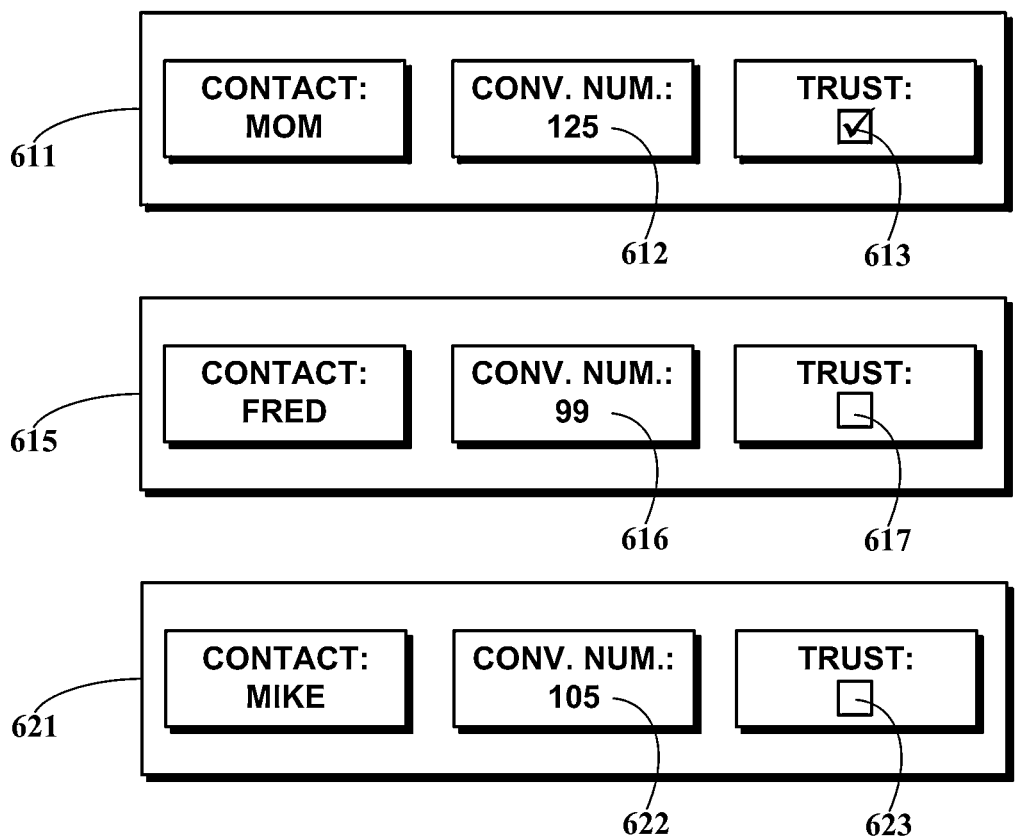
FIG. 6C shows simplified block diagrams depicting a second set of example contact data that may be stored by the network devices shown in FIG. 6A.

For example, in one embodiment, when the sender creates a new contact, he may populate a trust indicator field and thereby designate the new contact as a trusted contact. FIGS. 6B and 6C show simplified block diagrams depicting example contact data that may be stored by the network devices shown in FIG. 6A. Referring to FIG. 6B, contact data 601 corresponds to the contact data of MOM, while contact data 605 corresponds to the contact data of FRED. Within the contact data, there may be a trust indicator field, among other fields. For example, trust indicator fields 603, 607 of FIG. 6B. When the trust indicator field is populated, the trust indicator field is enabled and the new contact is therefore designated as a trusted contact. Referring again to FIG. 6B, the trust indicator associated with contact MOM is enabled, i.e., MOM is a trusted contact, because the trust indicator field 603 is populated, while the trust indicator associated with contact FRED is not enabled because the trust indicator field 607 is not populated.

In other embodiments, the trust indictor associated with the contact may be enabled based on a number of communications between the first computing device and the second computing device. For example, contact data may include a conversation number, and the conversation number may be incremented whenever there is a communication between the sender and the receiver. When the conversation number reaches or exceeds a predefined threshold value, the first computing device may prompt the sender with an option to enable the trust indicator. For example, the sender may be prompted to populate a trust indicator field of the receiver's contact data.

FIG. 6C depicts a set of contact data with corresponding trust indicators that may be enabled based on the number of communications between the sender and the receiver. As shown, contact data 611 corresponds to the contact data of MOM, contact data 615 corresponds to the contact data for FRED, and contact data 621 corresponds to the contact data for MIKE. In the present example, the predefined threshold value number may be 100. Referring to contact data 611, the conversation number 612 indicates that the sender and MOM have had 125 communications. Consequently, the first computing device prompted the sender to populate the trust indicator field 613 upon the conversation number 612 reaching the predefined threshold value of 100. The populated trust indicator field 613 indicates that the sender designated MOM as a trusted contact when the first computing device prompted the sender to do so.

Turning to contact data 615, the conversation number 616 indicates that the sender and FRED have had only 99 communications. Since 99 communications is less than the predefined threshold value of 100 communications, the sender has not been prompted to populate the trust indicator field 617, as evidenced by the trust indicator field 617 not being activated. Therefore, FRED is not considered a trusted contact.

Lastly, referring to contact data 621, the conversation number 622 indicates that the sender and MIKE have had 105 communications. Since 105 communications is greater than the predefined threshold value of 100 communications, the sender was prompted to populate the trust indicator field 623. The non-populated trust indicator field 623 indicates that the sender did not elect to designate MIKE as a trusted contact. It should be understood that FIGS. 6B and 6C are example depictions of contact data and should not be taken to be limiting.

In another embodiment, the trust indictor associated with the contact may be enabled based on the location of the first computing device and/or the location of the second computing device. For example, a comparison of GPS location data of the sender device and GPS location data of the receiver device may be performed. When the GPS location data of the sender device and the GPS location data of the receiver device are within a predefined radius of each other, the first computing device may prompt the sender with an option to enable the trust indicator. For example, the sender may be prompted to populate a trust indicator field of the receiver's contact data. Any location comparisons may be carried out by the first computing device, the second computing device, and/or at a system server.

In other embodiments, the trust indicator associated with the contact may be enabled based on cellular service data of the first computing device and/or cellular service data of the second computing device. The cellular service data of the first computing device may indicate computing devices which are on the same cellular data plan as the first computing device. Likewise, the cellular service data of the second computing device may indicate computing devices which are on the same cellular data plan as the second computing device. In one example, the cellular service data of the first computing device may be analyzed, and after determining what computing devices are included on the cellular data plan of the first computing device, the first computing device may prompt the sender with an option to enable the corresponding contacts' trust indicators. Such analysis may be carried out by the first computing device, the second computing device, and/or at a system server.

In another embodiment, the trust indicator associated with the contact may be enabled based on social-media data associated with the first computing device, where the social-media data indicates, for example, "friend" contacts and/or "family" contacts. Such contacts may be derived from social media websites. In one example, the social-media data associated with the first computing device may be analyzed and computing devices associated with "friend" or "family" contacts may be identified. Such analysis and identification may be carried out by the first computing device, the second computing device, and/or at a system server. After identifying computing devices associated with contacts who are "friends" and/or "family", the first computing device may prompt the sender with the option to enable the trust indicators for those identified contacts.

In other embodiments, the trust indicator associated with the contact may be enabled based on a comparison of sender-name data associated with the first computing device and contact-name data associated with the second computing device. The sender-name data may include the first and/or last name of the sender. The contact-name data may be included in the contact data and may include the first and/or last name of the receiver. In one example, if the sender-name data and the contact-name data indicate that the sender and the contact have the same last name, the first computing device may prompt the sender with the option to enable the trust indicator associated with the contact. The sender-name data and the contact-name data may be located on a storage device that is maintained or otherwise accessible by the first computing device, such as storage device 1424 discussed further below with respect to FIG. 14.

In another embodiment, the first computing device may maintain photo-album data that includes at least one image file. The photo-album data may be located on a storage device that is maintained or otherwise accessible by the first computing device, such as storage device 1424 discussed further below with respect to FIG. 14. Furthermore, the contact data for a given contact may include face data pertaining to the given contact. The trust indicator associated with the contact may be enabled based on a determination that the photo-album data corresponds to the face data associated with the contact. For example, if a number of image files that correspond to the face data exceeds a threshold value, the first computing device may prompt the sender with the option to enable the trust indicator associated with the contact.

Returning to the example methods, after receiving the command to send the message data and determining that the contact associated with the second computing device is a trusted contact, at block 703, the first computing device may cause the multimedia-capture device to obtain multimedia data. As discussed above, the multimedia-capture device may be a camera or a video-camera, among other devices.

The multimedia data may be image data, video data, or audio data. For example, the first computing device may cause a sound-recording device to record ambient sounds. In another example, the first computing device may cause a video-camera to record a video.

Figure 9:
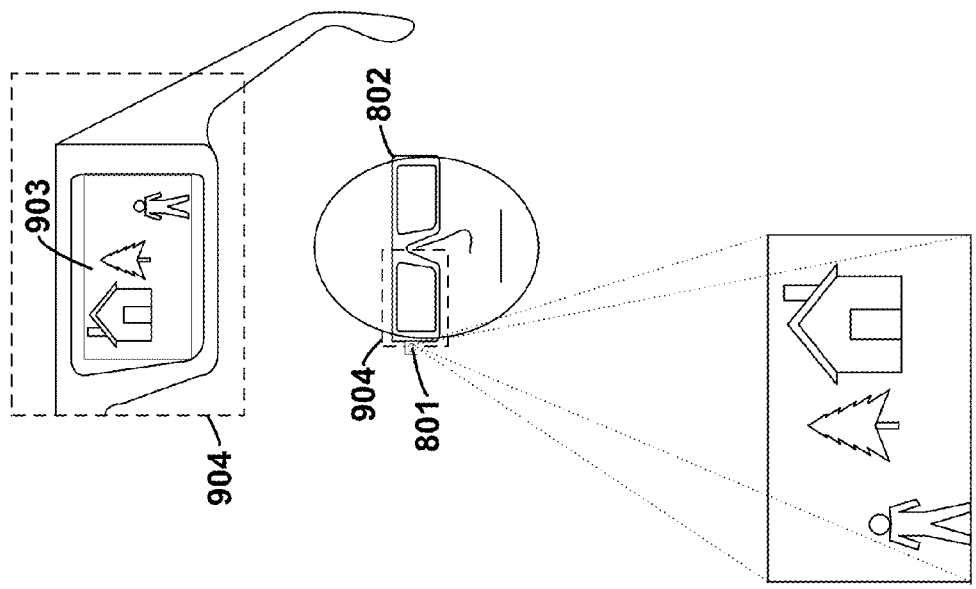
FIG. 9 shows obtaining multimedia data in accordance with the first example method at Time 2.

In one example, as shown in FIG. 9, at Time 2, the first computing device captures an image via the camera 801. An enlarged view of a sender's graphical display 904 is shown, in mirror image, reflecting how the sender may see image data 903 on his HMD 802, i.e., a person standing to the right of a home. As depicted in FIGS. 8 and 9, the image 803 within the camera's sights at Time 1 is the same as the captured image data 903 at Time 2. This indicates that the time lapse between Time 1 and Time 2 is minimal. However, variation between the image 803 at Time 1 and the captured image data 903 at Time 2 may be possible.

In accordance with block 703, the first computing device may transmit a capture signal to the multimedia-capture device to obtain the multimedia data. The first computing device may transmit different capture signals depending on the type of multimedia data that is desired. The type of multimedia data that is desired may be identified or otherwise determined based on the message data and/or the trusted contact, among other considerations. For example, the first computing device may transmit an image capture signal when the message data is textual data and a video capture signal for all other types of message data. In another example, the first computing device may transmit an audio capture signal and an image capture signal when the trusted contact is considered "family" and only an image capture signal when the trusted contact is considered a "friend." In other examples, the first computing device may transmit a particular capture signal, for instance, an image capture signal, regardless of the type of message data. Other possibilities are certainly possible and within the scope of the present invention.

At block 704, the first computing device may transmit trusted-contact data. The trusted-contact data may be transmitted to the second computing device either directly or indirectly, for example, through a system server. The trusted-contact data may include any suitable combination of the message data, the multimedia data, and environmental data.

The message data and multimedia data may be obtained as described above. The environmental data may be obtained before, at the same time, or after the first computing device obtained the multimedia data. The environmental data may be obtained via any suitable sensor, such as a GPS sensor, a heart-rate monitor, and/or the multimedia-capture device. The environmental data may indicate at least one environmental condition of the first computing device. The environmental condition may be a real-world, external condition, of the first computing device. For example, the environmental data may include: location data, which may be GPS coordinate data or a sender defined location name; video data; audio data; image data; weather data; and/or travel data, such as speed of travel and/or estimated time of arrival, among other examples. Additionally or alternatively, the environmental condition may indicate a computing condition of the first computing device. For example, the environmental data may include computing condition data that indicates a computing condition of the first computing device, such as, the name of a song file the sender's device is playing or the name of an application the sender's device is executing. Furthermore, the environmental data may include user-condition data that indicates at least one physiological condition of the user of the first computing device. For example, the user-condition data may indicate at least one of the user's heart-rate, blood pressure, breathing rate, and body temperature. As another example, the user-condition data may indicate an overall stress level of the user determined based on any of the physiological conditions previously noted. Other examples of environmental data may exist.

As noted, the first computing device may transmit the trusted-contact data to the second computing device or to a system server, for example the system server 605 of FIG. 6A. The first computing device may transmit the trusted-contact data to the second computing device directly, for instance, without the use of the system server or a system network. Alternatively, the first computing device may transmit the trusted-contact data to the second computing device indirectly via the system server or a system network.

Figure 10:
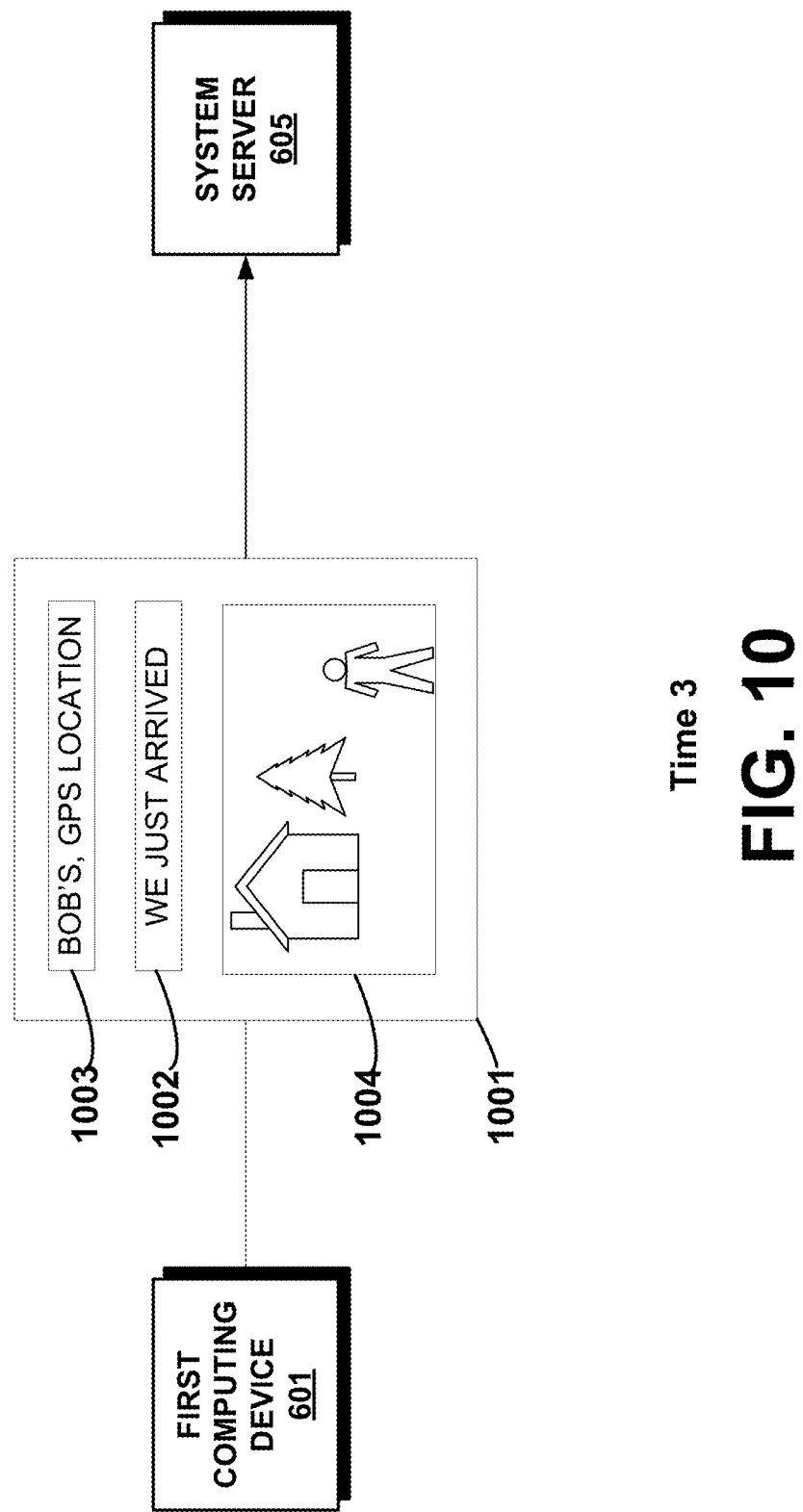
FIG. 10 shows transmitting trusted-contact data in accordance with the first example method at Time 3.

For example, as shown in FIG. 10, at Time 3, the first computing device 601 may transmit the trusted-contact data 1001 to the system server 605. In the illustrated example, the trusted-contact data 1001 may include textual data 1002, location data 1003 (which includes both a sender-defined location name: "BOB'S" and GPS coordinate data; in other embodiments, the location data may be GPS coordinate data converted into address data), and image data 1004. In another example, the trusted-contact data may further include audio data. In other examples, the trusted-contact data may include only message data and multimedia data. There are many other combinations that are possible, all of which are within the scope of the present invention.

As noted, the example method of FIG. 7B involves a system server. At block 710, the system server may receive trusted-contact data from the first computing device. Such trusted-contact data may have been transmitted as described above with respect to block 705 of FIG. 7A. At block 711, the system server may receive formatting data that corresponds to the second computing device. The formatting data may indicate at least one display characteristic of the second computing device. For example, the formatting data may indicate a dimension of the second computing device's display, the resolution of the display, the type of display, or a display-preference of the second user. Additionally or alternatively, the formatting data may indicate a particular message type that is displayable at the second computing device. For example, the message type may be MMS, SMS, email, normal text, or another rich-experience format that may be, for instance, proprietary. Other examples of message types may exist as well.

The system server may receive the formatting data from a variety of devices, for example, the first computing device, the second computing device, and/or another system server. It should be understood that blocks 710 and 711 may be performed simultaneously or sequentially without departing from the present invention.

At block 712, based on the received trusted-contact data and the received formatting data, the system server may transmit delivery data to the second computing device. The delivery data may include the message data, the multimedia data, and the environmental data, where the delivery data may be formatted based on the display characteristic indicated by the formatting data.

The delivery data may be formatted in a variety of ways. For example, if a display preference of the second user so indicates or if a message type so requires, the message data and/or the environmental data may be superimposed onto the multimedia data. In another example, additional text may be included with the message data and/or the environmental data. In other examples, additional text may be superimposed onto at least one of the message data, the environmental data, and the multimedia data. And if the display characteristic indicates, for example, a "high resolution," the delivery data may be formatted to display high-resolution multi media. Other examples may exist as well.

Figure 11:
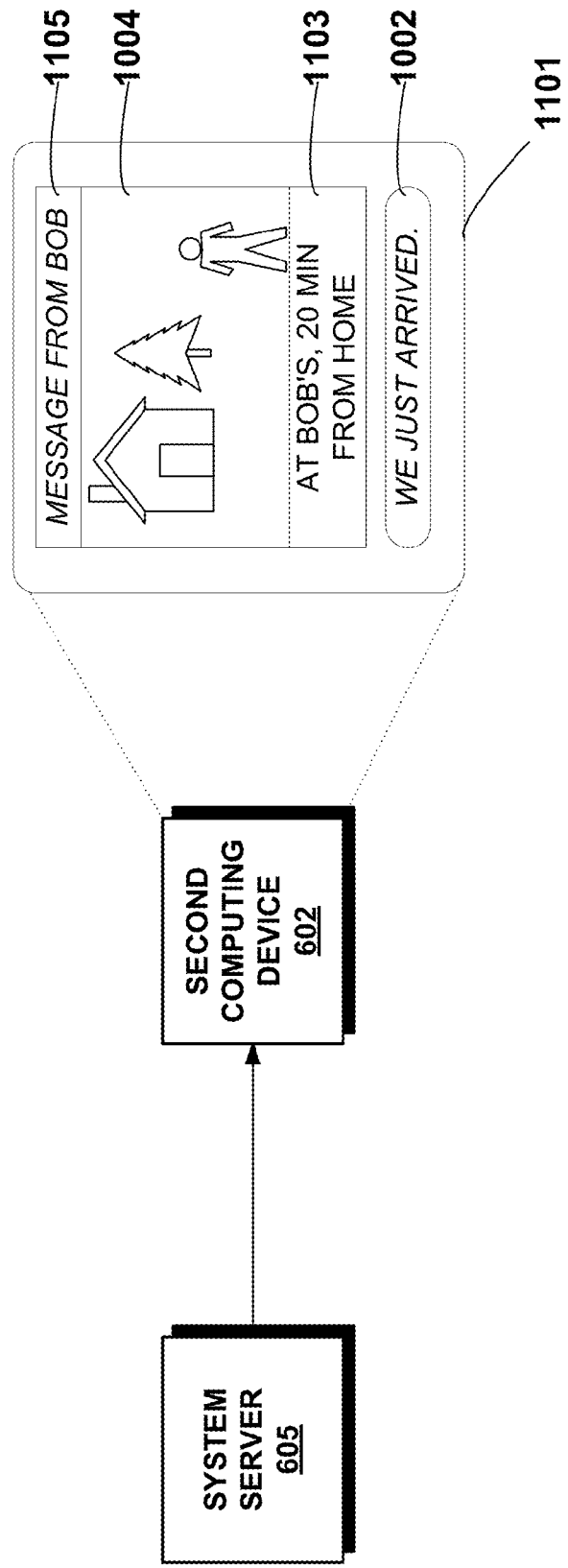
FIG. 11 shows transmitting delivery data in accordance with the second example method at Time 4.

The system server may transmit the delivery data to the second computing device via a communication network, for example the communication network 600 of FIG. 6A. As depicted in FIG. 11, at Time 4, the system server 605 may transmit the delivery data to the second computing device 602, and the second computing device 602 may receive and display the delivery data 1101. As depicted, the delivery data 1101 may include the textual data 1002, the environmental data ("AT BOB'S") superimposed onto the image data 1004, and the image data 1004. Furthermore, the environmental data, here, the location data ("AT BOB'S") may include additional textual information 1103, and a text banner 1105 may be superimposed onto the image data 1004. It should be understood that the example shown in FIG. 11 is set forth for purposes of example and explanation only. And it should be understood that the delivery data may be arranged in a variety of ways without departing from the present invention, so long as the delivery data is formatted based on the display characteristic indicated by the formatting data.

Figure 12:
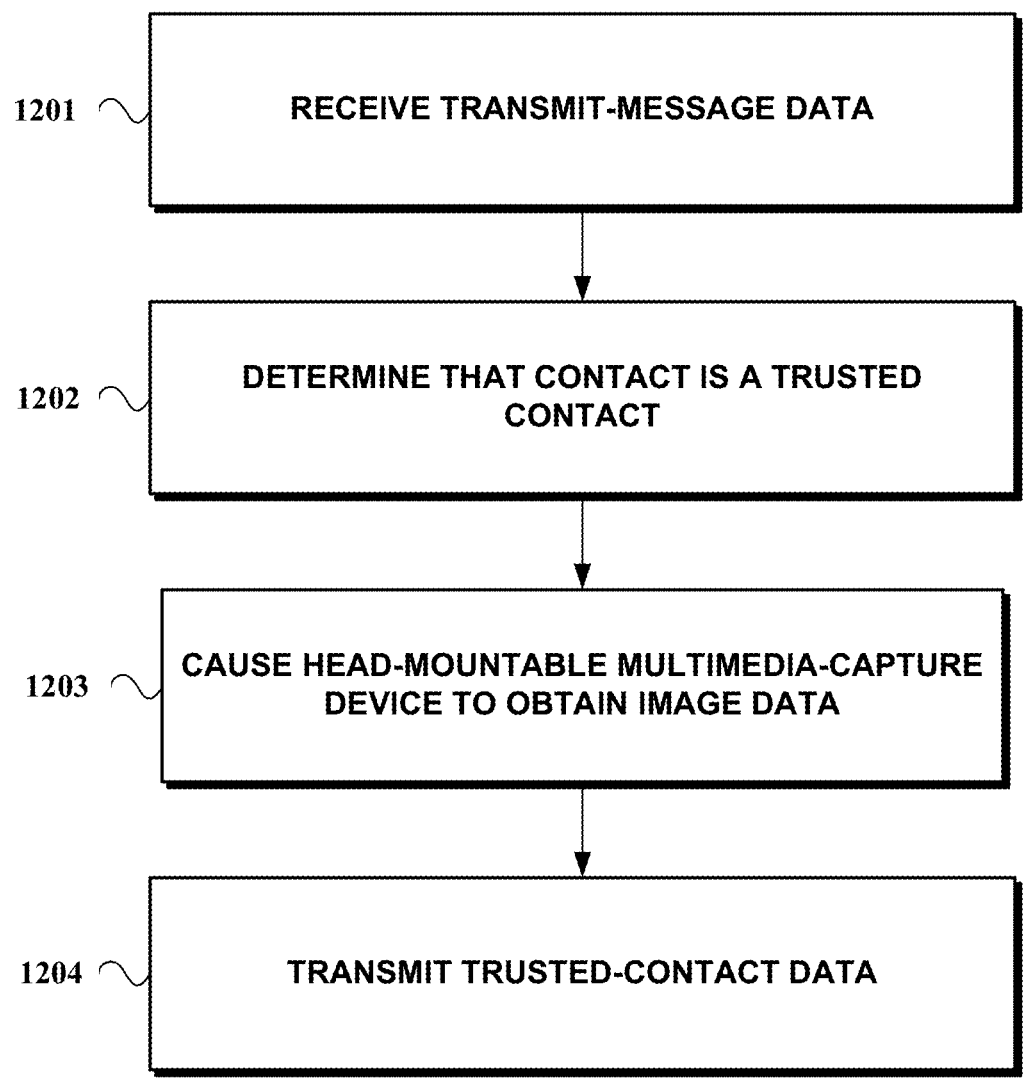
FIG. 12 shows a flowchart depicting a third example method.

FIG. 12 shows a flowchart depicting an additional example method involving the capture of image data, which may be implemented by a first computing device. At block 1201, the first computing device may receive the command to send message data in the same manner as block 701 of FIG. 7A, as described above. At block 1202 the first computing device may determine that a contact is a trusted contact in the same manner as block 702 of FIG. 7A, as described above. At block 1203, the first computing device may cause a multimedia-capture device to obtain image data. The multimedia-capture device may be part of the first computing device, for example, part of a HMD, or part of a separate device remotely coupled to the first computing device, for example, a Bluetooth camera coupled to a cellphone. At block 1204, the first computing device may transmit trusted-contact data in the same manner as block 704 of FIG. 7A, as described above. In accordance with block 1204, the trusted-contact data may include message data, image data, and/or environmental data.

Further, in accordance with the methods described above, a first computing device may obtain multimedia data during a phone conversation with a receiver. For example, the first computing device may receive inputs to initiate a phone conversation with a second computing device associated with a contact. The first computing device may then determine that the contact is a trusted contact in the same manner as block 702 of FIG. 7A, as described above. Once the sender and receiver begin the phone conversation, the first computing device may analyze the sender's voice for predefined phrases and/or words, which are part of a "hot" words database. If the contact is a trusted contact, when the first computing device detects "hot" words, the first computing device may obtain multimedia data in the same manner as block 703 of FIG. 7A, as described above. The first computing device may then transmit trusted-contact data either directly to the second computing device or indirectly to the second computing device via a communication system. The trusted-contact data may include the multimedia data and environmental data. In other embodiments, the trusted-contact data may include only the multimedia data.

Those skilled in the art will understand that the flowcharts 7A, 7B, and 12 described above illustrate functionality and operation of certain implementations of example embodiments. In this regard, each block of the flowchart may represent a module, a segment, or a portion of program code, which includes one or more instructions executable by a processor (e.g., processor 1402 described below with respect to system 1400) for implementing specific logical functions or steps in the process. The program code may be stored on any type of computer readable medium (e.g., computer readable storage medium or non-transitory media, such as memory 1404 or storage device 1424 described below with respect to system 1400), for example, such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, depending on the functionality involved, as would be understood by those reasonably skilled in the art.

V. Example Computing System and Network Architecture

Figure 13:
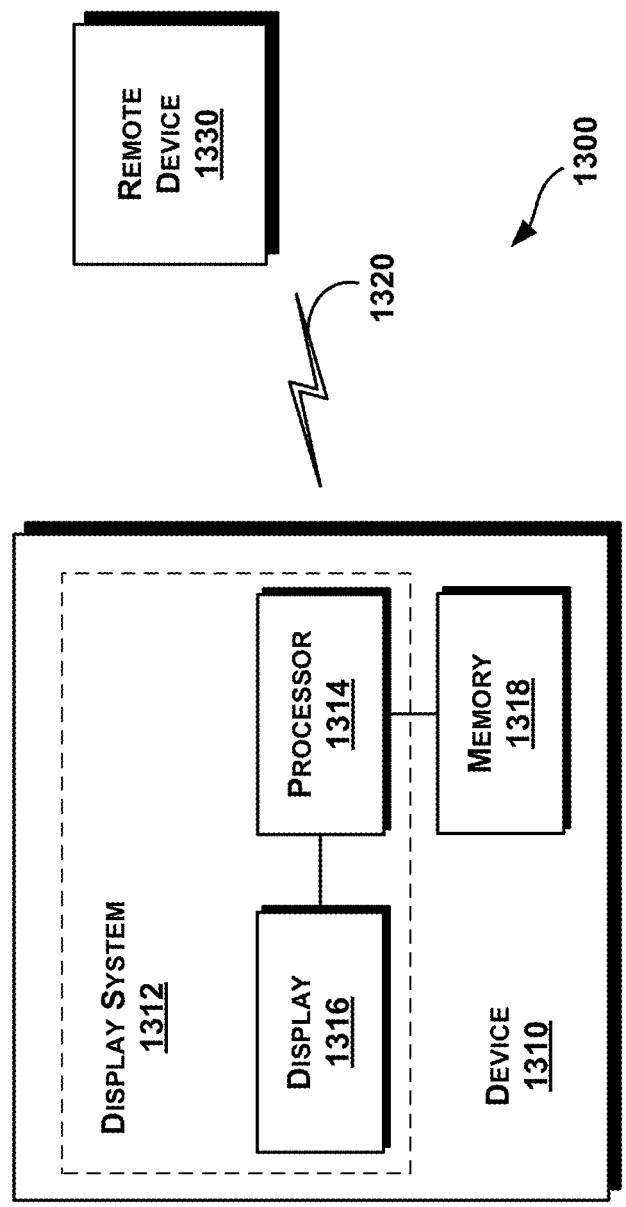
FIG. 13 shows a simplified block diagram of an example computer network infrastructure.

FIG. 13 shows a simplified block diagram of an example computer network infrastructure. In system 1300, a device 1310 communicates using a communication link 1320 (e.g., a wired or wireless connection) to a remote device 1330. The device 1330 may be any type of device that can receive data and display information corresponding to or associated with the data. For example, the device 1330 may be a heads-up display system, such as the HMD 202, 402, or 522 described with reference to FIGS. 2-5.

Thus, the device 1310 may include a display system 1312 comprising a processor 1314 and a display 1316. The display 1316 may be, for example, an optical see-through display, an optical see-around display, or a video see-through display. The processor 1314 may receive data from the remote device 1330, and configure the data for display on the display 1316. The processor 1314 may be any type of processor, such as a micro-processor or a digital signal processor, for example.

The device 1310 may further include on-board data storage, such as memory 1318 coupled to the processor 1314. The memory 1318 may store software that can be accessed and executed by the processor 1314, for example.

The remote device 1330 may be any type of computing device or transmitter including a laptop computer, a mobile telephone, or tablet computing device, etc., that is configured to transmit data to the device 1310. The remote device 1330 and the device 1310 may contain hardware to enable the communication link 1320, such as processors, transmitters, receivers, antennas, etc.

In FIG. 13, the communication link 1320 is illustrated as a wireless connection. The communication link 1320 may be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Alternatively, wired connections may also be used. For example, the communication link 1320 may be a wired serial bus such as a universal serial bus or a parallel bus, among other connections. Either of such a wired and/or wireless connection may be a proprietary connection as well. The remote device 1330 may be accessible via the Internet and may include a computing cluster associated with a particular web service (e.g., social-networking, photo sharing, address book, etc.).

Figure 14:
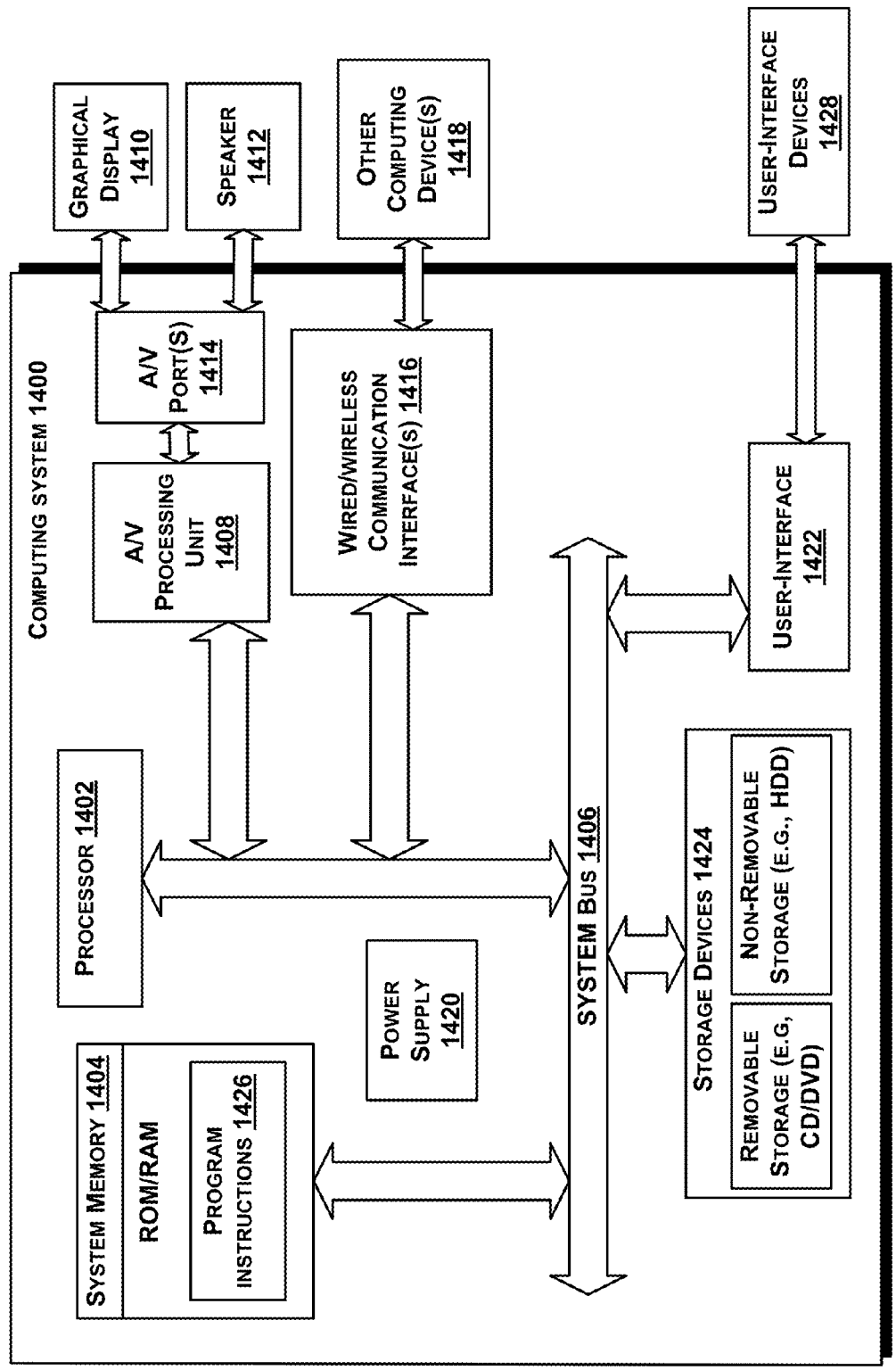
FIG. 14 shows a simplified block diagram depicting example components of an example computing system.

As described above, an example wearable computing device may include, or may otherwise be communicatively coupled to, a computing system. FIG. 14 shows a simplified block diagram depicting example components of an example computing system 1400. One or both of the device 1310 and the remote device 1330 may take the form of computing system 1400.

Computing system 1400 may include at least one processor 1402 and system memory 1404. In an example embodiment, computing system 1400 may include a system bus 1406 that communicatively connects processor 1402 and system memory 1404, as well as other components of computing system 1400. Depending on the desired configuration, processor 1402 can be any type of processor including, but not limited to, a microprocessor (µP), a microcontroller (µC), a digital signal processor (DSP), or any combination thereof. Furthermore, system memory 1404 can be of any type of memory now known or later developed including but not limited to volatile memory (such as RAM), non-volatile memory (such as ROM, flash memory, etc.) or any combination thereof.

An example computing system 1400 may include various other components as well. For example, computing system 1400 includes an A/V processing unit 1408 for controlling graphical display 1410 and speaker 1412 (via A/V port 1414), one or more communication interfaces 1416 for connecting to other computing devices 1418, and a power supply 1420. Graphical display 1410 may be arranged to provide a visual depiction of various input regions provided by user-interface module 1422. User-interface module 1422 may be further configured to receive data from and transmit data to (or be otherwise compatible with) one or more user-interface devices 1428.

Furthermore, computing system 1400 may also include one or more data storage devices 1424, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media implemented in any method or technology for storage of information, such as computer readable instructions, data structures, program modules, or other data. For example, computer storage media may take the form of RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium now known or later developed that can be used to store the desired information and which can be accessed by computing system 1400.

According to an example embodiment, computing system 1400 may include program instructions 1426 that are stored in system memory 1404 (and/or possibly in another data-storage medium) and executable by processor 1402 to facilitate the various functions described herein including, but not limited to, those functions described with respect to FIGS. 7A and 7B. Although various components of computing system 1400 are shown as distributed components, it should be understood that any of such components may be physically integrated and/or distributed according to the desired configuration of the computing system.

VI. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A system comprising:
   a multimedia-capture device;
   a non-transitory computer readable medium; and
   program instructions stored on the non-transitory computer readable medium and executable by at least one processor to cause a first computing device to:
   receive a command to send message data to a second computing device, wherein the second computing device is associated with a contact;
   determine that the contact associated with the second computing device is a trusted contact;
   based on (i) receiving the command to send the message data and (ii) determining that the contact associated with the second computing device is a trusted contact, cause the multimedia-capture device to capture multimedia data of the real-world surroundings of the first computing device; and
   transmit trusted-contact data to the second computing device associated with the trusted contact, wherein the trusted-contact data comprises (i) the message data, (ii) the multimedia data, and (iii) environmental data that corresponds to at least one environmental condition of the first computing device.

2. The system of claim 1, wherein determining that the contact associated with the second computing device is a trusted contact comprises searching a trusted contact list for the contact associated with the second computing device.

3. The system of claim 1, wherein determining that the contact associated with the second computing device is a trusted contact comprises determining that a trust indicator associated with the contact is enabled.

4. The system of claim 3, further comprising program instructions stored on the non-transitory computer readable medium and executable by at least one processor to cause the first computing device to:
   enable the trust indicator associated with the contact based on a number of communications between the first computing device and the second computing device.

5. The system of claim 3, further comprising program instructions stored on the non-transitory computer readable medium and executable by at least one processor to cause the first computing device to:
   enable the trust indicator associated with the contact based on at least one of location data of the first computing device and location data of the second computing device.

6. The system of claim 3, further comprising program instructions stored on the non-transitory computer readable medium and executable by at least one processor to cause the first computing device to:
   enable the trust indicator associated with the contact based on at least one of cellular service data of the first computing device and cellular service data of the second computing device.

7. The system of claim 3, further comprising program instructions stored on the non-transitory computer readable medium and executable by at least one processor to cause the first computing device to:
   enable the trust indicator associated with the contact based on social-media data associated with the first computing device.

8. The system of claim 7, wherein the social-media data indicates at least one of a friend contact and a family contact.

9. The system of claim 1, wherein the message data is at least one of (i) audio data, (ii) textual data, (iii) video data, and (iv) image data.

10. The system of claim 1, wherein the multimedia data is one of (i) image data, (ii) video data, and (iii) audio data.

11. The system of claim 1, wherein the environmental data is at least one of (i) video data, (ii) image data, (iii) audio data, (iv) location data, (v) computing-condition data that indicates a computing condition of the first computing device, and (vi) user-condition data that indicates a physiological condition of a user of the first computing device.

12. The system of claim 1, further including a GPS sensor, wherein the GPS sensor obtains the environmental data.

13. A computer-implemented method comprising:
- receiving, at a first computing device, a command to send message data to a second computing device, wherein the second computing device is associated with a contact;
- determining that the contact associated with the second computing device is a trusted contact;
- based on (i) receiving the command to send the message data and (ii) determining that the contact associated with the second computing device is a trusted contact, causing a multimedia-capture device to capture multimedia data of the real-world surroundings of the first computing device; and
- transmitting trusted-contact data to the second computing device associated with the trusted contact, wherein the trusted-contact data comprises (i) the message data, (ii) the multimedia data, and (iii) environmental data that corresponds to at least one environmental condition of the first computing device.

14. The method of claim 13, wherein determining that the contact associated with the second computing device is a trusted contact comprises searching a trusted contact list for the contact associated with the second computing device.

15. The method of claim 13, wherein determining that the contact associated with the second computing device is a trusted contact comprises determining that a trust indicator associated with the contact is enabled.

16. The method of claim 15, wherein the trust indicator is enabled based on comparing the number of communications between the first computing device and the second computing device with a threshold value.

17. The method of claim 15, wherein the trust indicator is enabled based on comparing the location data of the first computing device with the location data of the second computing device.

18. A non-transitory computer readable medium having instructions stored thereon, the instructions comprising:
- instructions for receiving a command to send message data to a second computing device, wherein the second computing device is associated with a contact;
- instructions for determining that the contact associated with the second computing device is a trusted contact;
- based on (i) receiving the command to send the message data and (ii) determining that the contact associated with the second computing device is a trusted contact, instructions for causing a multimedia-capture device to capture multimedia data of the real-world surroundings of the first computing device; and
- instructions for transmitting trusted-contact data to the second computing device associated with the trusted contact, wherein the trusted-contact data comprises (i) the message data, (ii) the multimedia data, and (iii) environmental data that corresponds to at least one environmental condition of a first computing device.

19. The non-transitory computer readable medium of claim 18, wherein determining that the contact associated with the second computing device is a trusted contact comprises determining that a trust indicator associated with the contact is enabled.

20. The non-transitory computer readable medium of claim 19, wherein the trust indicator is enabled based on a number of communications between the first computing device and the second computing device.

21. A system comprising:
- a non-transitory computer readable medium; and
- program instructions stored on the non-transitory computer readable medium and executable by at least one processor to cause the system to:
  - receive trusted-contact data that was generated by a first computing device, wherein the trusted-contact data comprises (i) message data, (ii) multimedia data that corresponds to data of the real-world surroundings of the first computing device, wherein the multimedia data was captured by the first computing device based on the first computing device (a) receiving a command to send message data to a second computing device associated with a contact and (b) determining that the contact is a trusted contact, and (iii) environmental data that corresponds to at least one environmental condition of the first computing device;
  - receive formatting data that corresponds to the second computing device, wherein the formatting data indicates at least one display characteristic of the second computing device; and
  - based on (i) the received trusted-contact data and (ii) the received formatting data, transmit delivery data to the second computing device, wherein the delivery data comprises (i) the message data, (ii) the multimedia data, and (iii) the environmental data, wherein the delivery data is formatted based on the display characteristic indicated by the formatting data.

22. The system of claim 21, wherein the message data is at least one of (i) audio data, (ii) textual data, (iii) video data, and (iv) image data.

23. The system of claim 21, wherein the multimedia data is one of (i) image data, (ii) video data, and (iii) audio data.

24. The system of claim 21, wherein the environmental data is at least one of (i) video data, (ii) image data, (iii) audio data, (iv) location data, (v) computing condition data that indicates a computing condition of the first computing device, and (vi) user-condition data that indicates a physiological condition of a user of the first computing device.

25. The system of claim 21, wherein the formatting data is received from the second computing device.

26. The system of claim 21, wherein the formatting data indicates at least one of a message type and a display characteristic.

27. A computer-implemented method comprising:
- receiving trusted-contact data that was generated by a first computing device, wherein the trusted-contact data comprises (i) message data, (ii) multimedia data that corresponds to data of the real-world surroundings of the first computing device, wherein the multimedia data was captured by the first computing device based on the first computing device (a) receiving a command to send message data to a second computing device associated with a contact and (b) determining that the contact is a trusted contact, and (iii) environmental data that corresponds to at least one environmental condition of the first computing device;
- receiving formatting data that corresponds to the second computing device, wherein the formatting data indicates at least one display characteristic of the second computing device; and
- based on (i) the received trusted-contact data and (ii) the received formatting data, transmitting delivery data to the second computing device, wherein the delivery data comprises (i) the message data, (ii) the multimedia data, and (iii) the environmental data, wherein the delivery data is formatted based on the display characteristic indicated by the formatting data.

28. The method of claim 27, wherein the formatting data indicates at least one of a message type and a display characteristic.

29. A non-transitory computer readable medium having instructions stored thereon, the instructions comprising:
- instructions for receiving trusted-contact data that was generated by a first computing device, wherein the trusted-contact data comprises (i) message data, (ii) multimedia data that corresponds to data of the real-world surroundings of the first computing device, wherein the multimedia data was captured by the first computing device based on the first computing device (a) receiving a command to send message data to a second computing device associated with a contact and (b) determining that the contact is a trusted contact, and (iii) environmental data that corresponds to at least one environmental condition of the first computing device;
- instructions for receiving formatting data that corresponds to the second computing device, wherein the formatting data indicates at least one display characteristic of the second computing device; and
- based on (i) the received trusted-contact data and (ii) the received formatting data, instructions for transmitting delivery data to the second computing device, wherein the delivery data comprises (i) the message data, (ii) the multimedia data, and (iii) the environmental data, wherein the delivery data is formatted based on the display characteristic indicated by the formatting data.

30. The non-transitory computer readable medium of claim 29, wherein the formatting data indicates at least one of a message type and a display characteristic.

\* \* \* \* \*